S. PIERCE.

Cook-Stove.

No. { 136, 1,240. }

Reissued Dec. 3. 1861.

Fig. 4. x. x

Fig. 5. z. z.

N. PETERS, PHOTO-LITHOGRAPHER, WASHINGTON, D. C.

UNITED STATES PATENT OFFICE.

SAMUEL PIERCE, OF TROY, NEW YORK, ASSIGNOR TO JOHNSON & COX, OF SAME PLACE, ASSIGNORS, THROUGH MESNE ASSIGNMENTS, TO SAMUEL PIERCE AFORESAID.

IMPROVEMENT IN COOKING-STOVES.

Specification forming part of Letters Patent No. 4,299, dated December 6, 1845; Reissue No. 91, dated April 24, 1847; Reissue No. 99, dated July 31, 1847; extended December 6, 1859; Reissue No. 1,240, dated December 2, 1861.

DIVISION No. 1.

*To all whom it may concern:*

Be it known that I, SAMUEL PIERCE, of the city of Troy, county of Rensselaer, and State of New York, did on or about the 6th day of December, 1845, obtain of and from the United States of America certain Letters Patent for and upon new and useful Improvements in Cooking-Stoves, and bearing title of "Improvements in Cooking-Stoves," which were duly reissued on the 24th day of April, 1847, and again on the 31st day of July, 1847, and which were duly extended in conformity to law on or before the 6th day of December, 1859, for a term of seven years from and after the 6th day of December, 1859.

Figure 1:
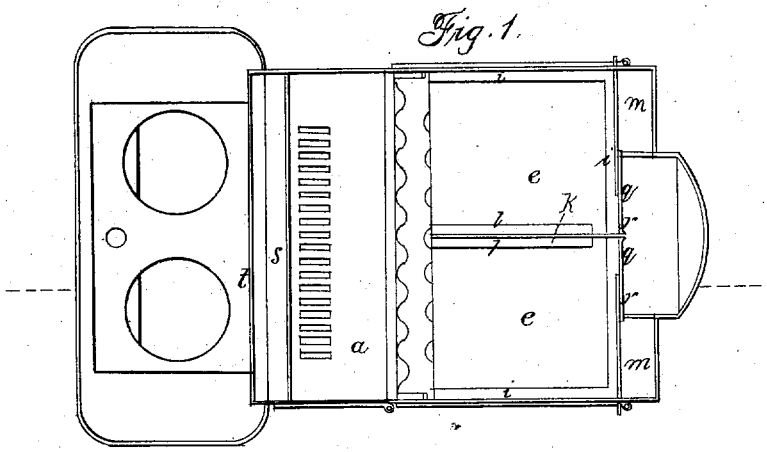
Figure 3:
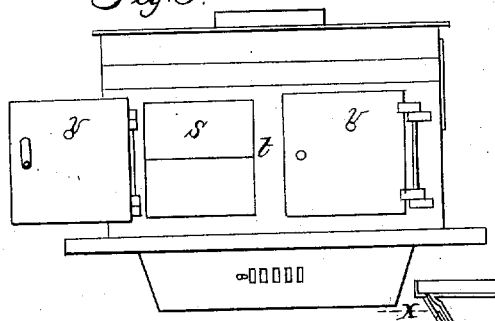
Figure 2:
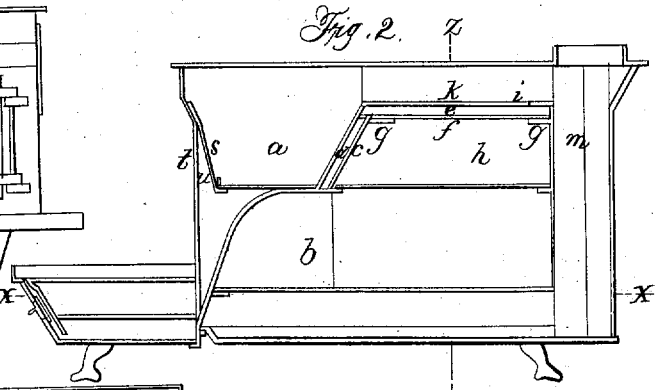
Figure 2:
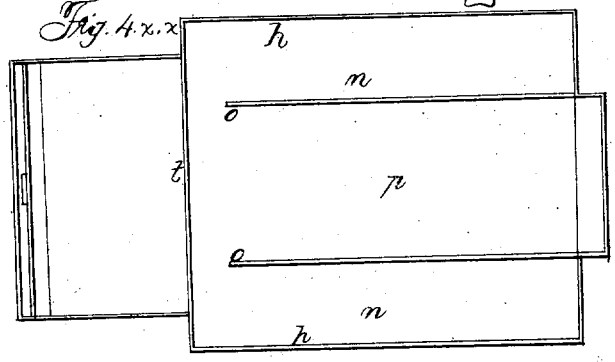
Figure 2:
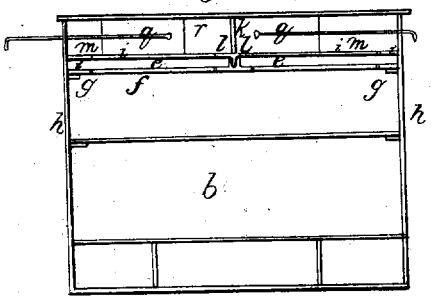

I therefore do hereby declare that the following is a full and exact description of the said improvements relating to the third part of the said invention set forth in the said last reissue, and known among stove-dealers as the "curve-plate." The other parts of the said improvements I have fully described in another specification of even date herewith, and in this application for a reissue of the said extended Letters Patent, asking thereby separate patents upon the parts of the said invention as described in each specification thereof, reference being had to the accompanying drawings and to letters of reference marked thereon, making a part of this specification, in which the improvement herein described is shown at Figure 2.

The nature of the improvement herein described consists in extending the front part of the oven under the fire-grate by means and use of a curve or incline plate, hereinafter described and set forth, or its equivalent.

In the accompanying, drawings, *a* represents the fire-chamber, and *b* that part of the oven which extends under the said fire-grate *a'*. The curve or incline plate *b'* commences at and joins with the lower edge of the inclined fire-back *c*, or its equivalent, and extends forward and downward in an inclined, curved, or other course until it reaches the front lower corner of the oven, where it meets or unites with the bottom plate of the said oven, or its equivalent, thus and thereby forming an oven extending its front lower portion under the fire-grate *a'*, which extended part is designated by *b*. The said curved or inclined plate *b'* may be made to extend upward from the said bottom plate of the oven, in a perpendicular or somewhat inclined direction to any desired height, from which point it will then extend back in an inclined direction until it reaches and joins the said fire-back *c*, and may be made in one or more parts, as deemed best. There are many advantages gained by this improvement. Among them are the following, to wit: First, the ashes which fall from the fire-chamber *a* through the grate *a'* will run down this plate, when properly constructed, into an ash-pan at the bottom thereof, and are there deposited, whereby the stove cleans itself of ashes; second, this arrangement prevents the burning out of the fire-grate in the said fire-chamber, which so frequently occurs in cooking-stoves when that part of the oven is so formed as to answer the purpose of an ash-pan, for by negligence in the use of such stoves, and where this improvement is not used, the ashes accumulate and extend up to the under side of the said fire-grate, thereby preventing the escape or passage of heat from the said fire-grate *a'*, and, as a consequence, cause the said grate to burn out or warp in a short time, by means of which a new fire-grate is often required; third, when the fire-grate in the said fire-chamber is dumped, the entire contents of the said fire-box or chamber are conducted into the ash-pan below, by means of the passage thus formed in front of the said oven and between the said plate and said front plate or doors; fourth, this part of the oven extending under the fire-grate *a'*, as hereinbefore described, will be heated more effectually and equally; and, fifth, a larger and better oven for baking purposes is constructed, which is convenient, useful, and economical in the use of any cooking-stove.

Having thus described my original improve-ment in cooking-stoves, what I claim as my original improvement is—

The extending of the front lower part of the oven under the fire-grate $a'$ by means of the said plate $b'$, substantially as and for the purposes herein described and set forth.

In testimony whereof I have, on this 4th day of September, 1861, hereunto set my hand.

SAMUEL PIERCE.

Witnesses:
FRANK SCOTT,
MARCUS P. NORTON.